June 10, 1930.  L. RODEN  1,762,486
GATE VALVE BOX CLEANER
Filed Feb. 16, 1927
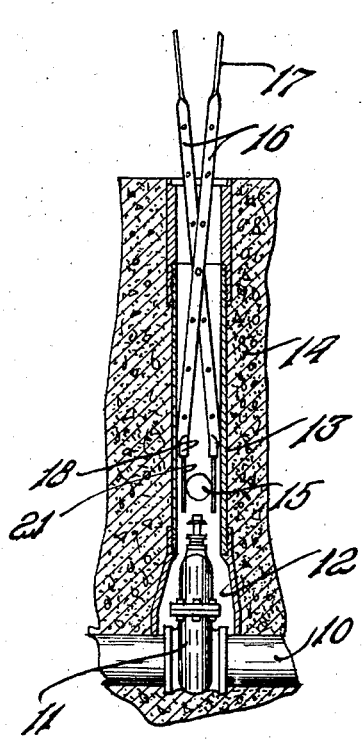
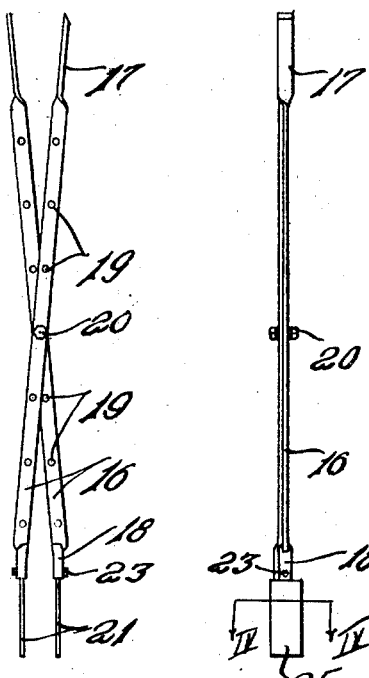
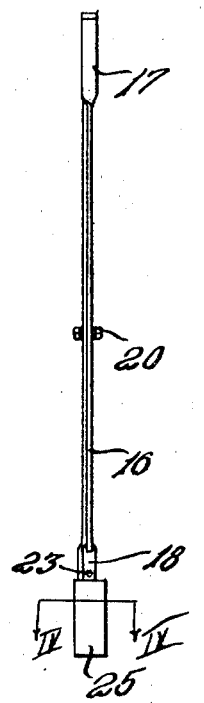
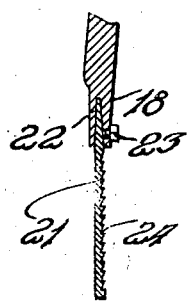
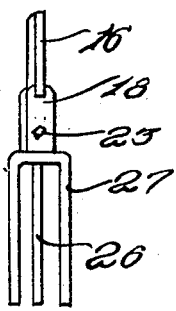
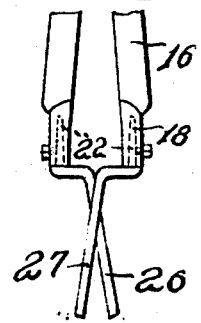
Inventor
Louis Roden Patented June 10, 1930

1,762,486

UNITED STATES PATENT OFFICE

LOUIS RODEN, OF BERWYN, ILLINOIS

GATE-VALVE-BOX CLEANER

Application filed February 16, 1927. Serial No. 168,803.

This invention relates to a tool for cleaning out relatively deep holes such as the gate valve boxes used on water mains.

It is an object of this invention to provide an improved tool for cleaning out valve boxes and other small diameter holes, comprising a pair of tongs with a shiftable fulcrum point therefor and a series of interchangeable jaws of various shapes adapted to grip different objects positioned in the hole. Gate valve boxes for water mains are ordinarily about five feet deep and about five inches in diameter so that if a rock or other foreign matter is accidently dropped into the box it renders the valve inaccessible unless the object can be fished out, otherwise the entire box would have to be dug out at considerable expense. Such foreign matter may be removed with a minimum of trouble by means of my improved tool.

Other and further important objects of this invention will be apparent from the disclosures in the drawing and specification.

The invention (in a preferred form) is illustrated in the drawings and hereinafter more fully described.

On the drawings:

Figure 1 is a section through a valve box showing a device embodying the features of this invention in use therein.

Figure 2 is a front view of the tongs alone.

Figure 3 is a side view of the tongs.

Figure 4 is an enlarged section on the line IV—IV of Figure 3.

Figure 5 is a fragmentary section through another form of jaw.

Figure 6 is a fragmentary side view of another form of jaws.

Figure 7 is a front view of Figure 6.

As shown on the drawings:

A water main 10 with a gate valve 11 is shown in Figure 1 the usual form of valve box 12 with a pipe 13 extending to the surface of the ground 14 being shown in section. The pipe 13 is usually no larger than necessary to receive a valve operating tool so that if foreign matter, such for example as a lump 15, should drop down the pipe it becomes a difficult matter to fish it out to permit access to the valve.

A pair of tongs 16 provided with handle portions 17 and sockets 18 for various forms of jaws, the tongs being pivoted at several points 19 by means of a pivot bolt 20 which can be shifted to vary the leverage of the tongs as well as the angular opening of the jaws, the latter reason for the adjustment having an important bearing on the forms of the jaws for picking up different objects.

As shown in Figure 2 the jaws 21 may be simple bars with tangs 22 entering the sockets 18 and clamped therein by screws 23, and these bars 21 may have teeth 24 cut therein as shown in Figure 5 to assist in gripping the foreign matter. Another form of jaws 25 are shown in Figures 3 and 4 which are interchangeable with those previously described, these jaws being trough shaped to envelope a bulky lump. The fork or tine type of intermeshing jaws shown in Figures 6 and 7 comprise a single finger type jaw 26 and a double finger jaw or tine 27, this arrangement being especially suitable for picking up slender objects such as wires and the like. The bent form of these jaws causes them to intermesh when the tongs are closed and the jaws work best with a short fulcrum giving a wide angle of opening.

In the use of this device the proper form of jaws are inserted in the tong sockets and the fulcrum positioned to give the desired leverage and angle of opening of the jaws after an inspection of the object obstructing the valve box, thus permitting a wide range of adjustment to suit varying conditions.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

A cleaner for use in relatively deep and narrow valve boxes comprising a pair of flat elongated straight members, each member having a handle at one end and a tined jaw removably secured at the other end and having spaced apertures along substantially the whole of the portion intermediate the handle and the jaw, a pivot bolt engaging the said elongated members, said jaws being in deflected relation to sail elongated members, whereby the jaws project in parallel relation to each other when opened for passage downwardly into a valve box as the cleaner is entered therein, a tine on one jaw being arranged to intermesh with the tines on the other jaw.

In testimony whereof I have hereunto subscribed my name.

LOUIS RODEN.